(12) United States Patent
Xie et al.

(10) Patent No.: US 9,949,327 B2
(45) Date of Patent: Apr. 17, 2018

(54) LED SYSTEM WITH DRIVER VOLTAGE CLAMPING

(71) Applicant: TEXAS INSTRUMENTS INCORPORATED, Dallas, TX (US)

(72) Inventors: Makalo Xie, Shenzhen (CN); Feifei Shen, Shenzhen (CN); Richard Tan, Shenzhen (CN); Alex Ruan, Shenzhen (CN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/569,094

(22) PCT Filed: Feb. 28, 2014

(86) PCT No.: PCT/CN2014/072691
§ 371 (c)(1),
(2) Date: Dec. 12, 2014

(87) PCT Pub. No.: WO2015/127645
PCT Pub. Date: Sep. 3, 2015

(65) Prior Publication Data
US 2016/0360584 A1 Dec. 8, 2016

(51) Int. Cl.
*H05B 33/08* (2006.01)
*G09G 3/32* (2016.01)
*H05B 37/02* (2006.01)

(52) U.S. Cl.
CPC ......... *H05B 33/0842* (2013.01); *G09G 3/32* (2013.01); *H05B 33/089* (2013.01);
(Continued)

(58) Field of Classification Search
CPC ............ H05B 33/0842; H05B 37/0281; H05B 37/029; H05B 33/0845; G09G 3/32
See application file for complete search history.

(56) References Cited

U.S. PATENT DOCUMENTS

2007/0257645 A1 11/2007 Nishino
2009/0322235 A1* 12/2009 Shiu ................... H05B 33/0845
315/185 R
(Continued)

FOREIGN PATENT DOCUMENTS

CN 101730331 A 6/2010

OTHER PUBLICATIONS

PCT Search Report for PCT/CN2014/072691, dated Nov. 26, 2014.
CN101730331A, English Machine Translation.

*Primary Examiner* — Alexander H Taningco
*Assistant Examiner* — Seokjin Kim
(74) *Attorney, Agent, or Firm* — William B. Kempler; Charles A. Brill; Frank D. Cimino (57) ABSTRACT

One example includes a light-emitting diode (LED) system. The LED system includes an LED array comprising a plurality of LEDs that are each activated via an LED current provided therethrough to provide illumination. The system also includes an LED controller configured to sequentially activate the plurality of LEDs via at least one LED driver system configured to selectively provide the LED current through each sequential one of the plurality of LEDs in an activated state in response to an activation signal. The at least one LED driver system includes a voltage clamp configured to maintain a substantial constant amplitude difference of a driver voltage associated with the LED current from the activated state to a deactivated state.

19 Claims, 5 Drawing Sheets (52) U.S. Cl.
CPC ....... *H05B 33/0824* (2013.01); *H05B 37/029* (2013.01); *H05B 37/0281* (2013.01)

(56) References Cited

U.S. PATENT DOCUMENTS

| | | |
|---|---|---|
| 2012/0161668 A1 | 6/2012 | Chang et al. |
| 2012/0274233 A1 | 11/2012 | Chen et al. |
| 2013/0162696 A1* | 6/2013 | Matsumoto ............ G09G 3/32 345/690 |

* cited by examiner

LED SYSTEM WITH DRIVER VOLTAGE CLAMPING

RELATED APPLICATIONS

The present invention is a U.S. National Stage under 35 USC 371 patent application, claiming priority to Serial No. PCT/CN2014/072691, filed on 28 Feb. 2014, the entirety of which is incorporated herein by reference.

TECHNICAL FIELD

This disclosure relates generally to electronic circuit systems, and more specifically to an LED system with driver voltage clamping.

BACKGROUND

The use of light-emitting diode (LED) strings instead of fluorescent bulbs for use in illumination of a backlight for a display, such as a television, a monitor for a laptop computer, or an LED wall, is increasing drastically based on consumer demands for better picture quality. In addition, typical LED light efficacy can be much better than conventional lighting systems for such displays, thus consuming significantly less power. In addition, among other advantages, LED systems can be smaller and more environmentally friendly, and can have a faster response with less electro-magnetic interference (EMI) emissions. A number of LED regulation techniques exist for typical LED systems. A typical LED system that can be implemented for a display can utilize different colored LEDs, such as red, green, and blue. However, delays between activations of LEDs in a given sequence, such as in scanning by rows, can result in a lack of uniformity in intensity across the display, especially in low grayscale conditions.

SUMMARY

One example includes a light-emitting diode (LED) system. The LED system includes an LED array comprising a plurality of LEDs that are each activated via an LED current provided therethrough to provide illumination. The system also includes an LED controller configured to sequentially activate the plurality of LEDs via at least one LED driver system configured to selectively provide the LED current through each sequential one of the plurality of LEDs in an activated state in response to an activation signal. The at least one LED driver system includes a voltage clamp configured to maintain a substantial constant amplitude difference of a driver voltage associated with the LED current from the activated state to a deactivated state.

Another example includes a method for providing substantially uniform illumination in an LED system. The method includes sequentially activating a plurality of rows of LEDs arranged in an array. The method also includes activating a switch in response to an activation signal to conduct an LED current through an LED in a respective activated one of the plurality of rows of LEDs to activate the LED. The switch can be coupled to the LED via an intermediate node having a driver voltage. The method also includes deactivating the switch via a deactivation signal to deactivate the LED. The method further includes conducting a clamping current from the intermediate node to set a maximum amplitude of the driver voltage while the switch is deactivated.

Another embodiment includes an LED system. The system includes an LED array comprising a plurality of LEDs arranged in a plurality of rows and a plurality of columns that are each activated via an LED current provided therethrough to provide illumination. The system also includes an LED controller. The LED controller includes an activation controller configured to sequentially activate each of the plurality of rows and to provide activation signals in response to a digital input. The LED controller also includes a plurality of LED driver systems that are each associated with a respective one of the plurality of columns. Each of the plurality of LED driver systems can be configured to activate one of the plurality of LEDs in a respective activated one of the plurality of rows in response to a respective one of the activation signals. Each of plurality of LED driver systems can include a voltage clamp configured to maintain a substantial constant amplitude difference of a driver voltage associated with the LED current between activation of one of the plurality of LEDs in the respective one of the plurality of columns and deactivation of the plurality of LEDs in the respective one of the plurality of columns.

DETAILED DESCRIPTION

This disclosure relates generally to electronic circuit systems, and more specifically to an LED system with driver voltage clamping. An LED system includes an LED array and an LED controller. As an example, the LED array can include red LEDs, green LEDs, and blue LEDs, and can be implemented in an LED display system (e.g., a television, a computer monitor, or an LED wall). The LED array can be arranged in a plurality of rows and columns. The LED controller can receive a digital input that can include grayscale data corresponding to activation of the LEDs. As an example, the digital input can be provided from an associated image processor. The LED controller can include an activation controller and LED driver systems. The activation controller that can be configured to sequentially activate each of the plurality of rows and can generate activation signals. The activation signals can be provided to the LED driver systems to provide an LED current through the LED in a respective activated row of the LED array to activate the respective LED in an activated state, and to deactivate the LED in a deactivated state.

The sequential activation of the plurality of rows of LEDs can be such that the rows are activated during a first time duration, and all of the rows can be deactivated during a second time duration. As an example, the second time duration can be much longer than a time between activation of consecutive rows during the first time duration. As a result, leakage current from the LEDs during the respective deactivated state can charge respective parasitic capacitors. A driver voltage at an intermediate node that interconnects the LED driver system (e.g., an activation switch of the LED driver system) and the LEDs in the respective column can thus increase slowly in response to the charging of the parasitic capacitor(s) via the leakage current(s), resulting in a greater difference between the driver voltage in the deactivated state and the driver voltage in the activated state. Accordingly, after the second time duration, and thus a relatively long delay prior to activation of the first LED in the column, the LED current flow pulls the driver voltage down to the amplitude in the activated state from a greater amplitude, resulting in a shorter activation time of the LED (e.g., the first activated LED in the column), and thus a non-uniformity of the associated LED display, particularly in low grayscale conditions. Accordingly, to substantially mitigate such non-uniformity, the LED driver system can include a voltage clamp to set a substantially constant amplitude difference between the driver voltage in the deactivated state and the driver voltage in the activated state. As a result, the driver voltage in the deactivated state can be approximately equal for all of the LEDs in a given column, thus resulting in an approximately equal activation time, and thus illumination uniformity, for all of the LEDs in the column.

Figure 1:
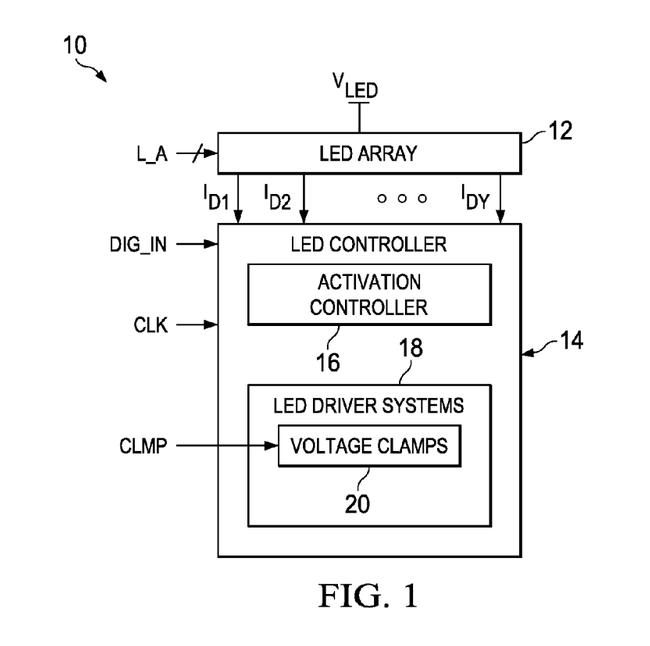
FIG. 1 illustrates an example of an LED system.

FIG. 1 illustrates an example of a light-emitting diode (LED) system 10. The LED system 10 can be implemented in a variety of illumination applications, such as in a display system (e.g., a computer monitor, television, or LED wall). The LED system 10 includes an LED array 12 that includes a plurality of LEDs powered by an LED voltage $V_{LED}$. As an example, the LED array 12 can include red LEDs, green LEDs, and blue LEDs that are arranged in an array of rows and columns to provide the respective illumination for a display screen. In the example of FIG. 1, the LED array 12 receives a set of row signals L_A that can sequentially activate the rows of the LEDs in the LED array 12. The LED system 10 also includes an LED controller 14 that is configured to activate the LEDs in the LED array 12 in response to a digital input signal DIG_IN. As an example, the digital input signal DIG_IN can be provided from an image processor (not shown) that is configured to process image data to control activation of sets of the LEDs in the LED array 12 to display an associated image.

In the example of FIG. 1, the LED controller 14 includes an activation controller 16 and LED driver systems 18. The activation controller 16 is configured to generate a set of activation signals based on the digital input DIG_IN, and the LED driver systems 18 are configured to activate the LEDs in the LED array 12. For example, the activation controller 16 can be configured to generate the set of row signals L_A that sequentially activate the rows in the LED array 12. As an example, the LED driver systems 18 can be arranged as any of a variety of amplifier types that are switchably controlled to initiate a current flow through the LEDs in the LED array 12, demonstrated in the example of FIG. 1 as a plurality of currents $I_{D1}$ through $I_{DY}$, where Y is a positive integer. For example, each of the currents $I_{D1}$ through $I_{DY}$ can correspond to a separate respective channel associated with a column of LEDs in the LED array 12, such as scanned individually by row via the row signals L_A. Therefore, the LEDs in the LED array 12 can provide respective portions of illumination based on the currents $I_{D1}$ through $I_{DY}$.

In the example of FIG. 1, each of the LED driver systems 18 includes a voltage clamp 20 that is configured to maintain a driver voltage associated with the currents $I_{D1}$ through $I_{DY}$ at a substantially constant amplitude difference between an activated state (e.g. when the respective one of the currents $I_{D1}$ through $I_{DY}$ is flowing to activate an LED in the LED array 12) and a deactivated state (e.g. when the respective one of the currents $I_{D1}$ through $I_{DY}$ is not flowing, and thus not activating an LED in the LED array 12). As an example, the voltage clamp 20 in each of the LED driver system 18 can be configured as a current source or a resistor that draws current from an intermediate node interconnecting the LED driver systems 18 and the respective column of LEDs and through which the currents $I_{D1}$ through $I_{DY}$ flow. Thus, in response to maintaining the substantially constant amplitude difference of the LEDs between the activated and deactivated states, the voltage clamp 20 can substantially mitigate non-uniformity in the column of LEDs of the LED array 12 based on providing an approximately equal activation time, and thus illumination uniformity, for the LEDs in the respective column of the LED array 12. In the example of FIG. 1, the voltage clamp 20 receives a signal CLMP that can correspond to an input signal for programmably setting the maximum amplitude of the driver voltage, as described in greater detail herein.

Figure 2:
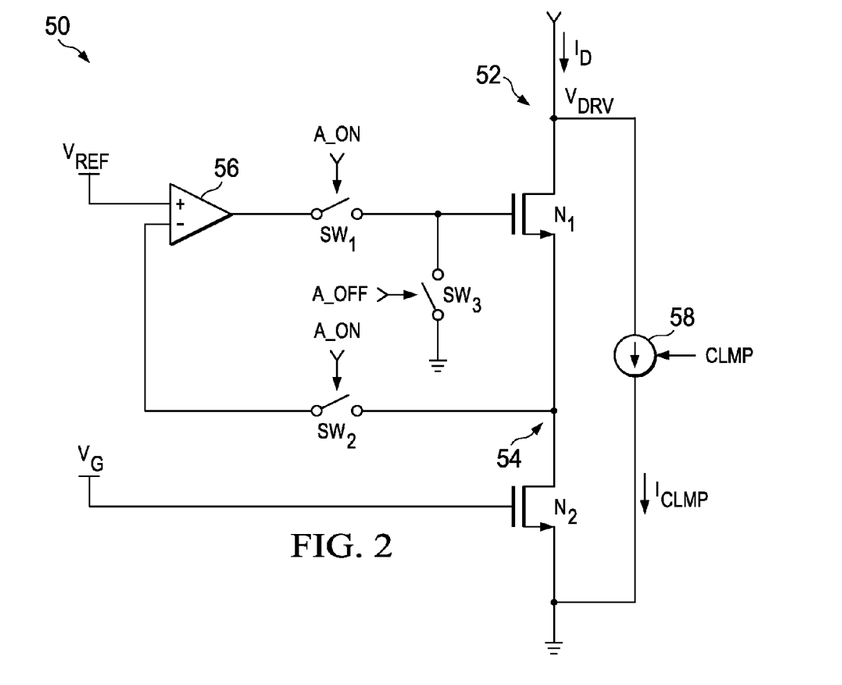
FIG. 2 illustrates an example of an LED driver system.

FIG. 2 illustrates an example of an LED driver system 50. The LED driver system 50 can correspond to one of the LED driver systems 18 in the example of FIG. 1. Therefore, reference is to be made to the example of FIG. 1 in the following description of the example of FIG. 2.

The LED driver system 50 includes an activation switch $N_1$, demonstrated in the example of FIG. 2 as an N-channel metal-oxide semiconductor field-effect transistor (MOSFET) having a drain coupled to an intermediate node 52 and a source coupled to a source node 54. As an example, the intermediate node 52 can be coupled to the LEDs in a respective column of the LED array 12 (e.g., at a cathode of each of the LEDs in the column of the LED array 12). The LED driver system 50 also includes an amplifier 56 having an output coupled to the gate of the activation switch $N_1$ via a switch $SW_1$, and has a non-inverting input coupled to a reference voltage $V_{REF}$ and an inverting input that is coupled to the source node 54 via a switch $SW_2$. Additionally, the LED driver system 50 includes a bias transistor $N_2$, demonstrated as an N-channel MOSFET, interconnecting the source node 54 at a drain and a low-voltage rail (e.g., ground) at a source. The bias transistor $N_2$ is coupled to a voltage $V_G$ at a gate, such as to operate the bias transistor $N_2$ in linear mode or saturation mode to provide an LED current $I_D$ during activation of the activation switch $N_1$ and the bias transistor $N_2$.

The switches $SW_1$ and $SW_2$ are activated via an activation signal A_ON, such as provided from the activation controller 16 (e.g., as defined by the digital input DIG_IN, such as provided from an image processor). Thus, the activation signal A_ON can be asserted to close the switches $SW_1$ and $SW_2$ to couple the output of the amplifier 56 to the gate of the activation switch $N_1$ and to couple the inverting input of the amplifier 56 to the source node 54. In response, the activation switch $N_1$ can be activated in linear mode or saturation mode to begin conducting the LED current $I_D$ through one of the LEDs in the respective column of the LED array 12 (e.g., in a row that is activated by the row signal L_A). As a result, the LED in the column of the LED array 12 is activated to provide illumination. In the example of FIG. 2, the intermediate node 52 through which the LED current $I_D$ flows has a driver voltage $V_{DRV}$ that has a first amplitude in a deactivation state, when the activation switch $N_1$ is deactivated and the LED current $I_D$ is not flowing, and a second amplitude that is less than the first amplitude in an activated state, when the activation switch $N_1$ is activated and the LED current $I_D$ is flowing. Accordingly, the driver voltage $V_{DRV}$ decreases from the first amplitude to the second amplitude in response to activation of the activation switch $N_1$, and thus the LED current $I_D$.

To deactivate the activation switch $N_1$, the activation signal A_ON is de-asserted and a deactivation signal A_OFF is asserted to close a switch $SW_3$ interconnecting the gate of the activation switch $N_1$ and the low-voltage rail. As an example, the deactivation signal A_OFF can be an inverted version of the activation signal A_ON, or can be a separate signal. Therefore, the voltage at the gate of the activation switch $N_1$ is pulled low to deactivate the activation switch $N_1$, ceasing the flow of the LED current $I_D$. The driver voltage $V_{DRV}$ increases from the second amplitude back to the first amplitude, and the LED driver system 50 is held in the deactivated state until the next LED in the column is to be activated (e.g., in response to the sequential activation of the next consecutive row of LEDs in the LED array 12.

In the deactivated state, the LEDs in the column of the LED array 12 can exhibit a leakage current that can build a charge on a parasitic capacitor of each of the LEDs in the column of the LED array 12. As an example, the leakage current can be very small (e.g., in the scale of nanoamps). As a result, in the deactivated state, the driver voltage $V_{DRV}$ can slowly increase over time, with the increase of the driver voltage $V_{DRV}$ being greater in response to longer durations of the deactivated state. As an example, the activation controller 16 can provide the set of row signals L_A during a first time duration to sequentially activate the rows of the LED array 12 for selective activation of the LEDs in each of the columns based on the activation signals (e.g., A_ON) via the respective LED driver systems (e.g., the LED driver system 50). After the sequential activation of the rows, the activation controller 16 can deactivate all of the rows for a second duration of time, which can be longer than a time between consecutive row activations in the sequence via the row signals L_A. As an example, the second time duration can be longer than the first time duration. As a result, the driver voltage $V_{DRV}$ can increase by a fraction of volt. However, because the rate of decrease of the driver voltage $V_{DRV}$ is substantially constant at the beginning of each activated state, a greater amplitude of the driver voltage $V_{DRV}$, such as greatest for activation of the first LED activated in the sequence of the activated rows, could result in less activation time for a given pulse of the activation signal A_ON. As described herein, the term "activation time" refers to a duration of time during which a given LED is activated and providing illumination. Accordingly, such difference in activation time can result in non-uniformity of an associated LED display, such as to provide a "first line dark" problem, which refers to a darker first line corresponding to a first row of sequentially activated LEDs relative to other rows in the sequence (e.g., in a low grayscale condition).

To substantially mitigate non-uniformity, and thus a potential first line dark problem, the LED driver system 50 includes a voltage clamp 58. The voltage clamp 58 is demonstrated in the example of FIG. 2 as a current source that provides a current $I_{CLMP}$ flowing from the intermediate node 52 to the low-voltage rail. The current $I_{CLMP}$ can be set, for example, based on a signal CLMP, such that the voltage clamp 58 can be programmable. As an example, the signal CLMP can be a signal that can be adjusted in real-time to provide dynamic changes to the current $I_{CLMP}$, or can be a more static setting, such as at fabrication or via dip switches or the like, to set the current $I_{CLMP}$ to a given magnitude. As an example, the current $I_{CLMP}$ can be set approximately equal to the leakage current of the LEDs in the column (e.g., a sum of the leakage current of all of the LEDs in the column). As a result, the current $I_{CLMP}$ can clamp the driver voltage $V_{DRV}$ to a maximum amplitude in the deactivated state, and thus to maintain a constant amplitude difference between the value of the driver voltage $V_{DRV}$ in the activated state and the deactivated state.

Figure 3:
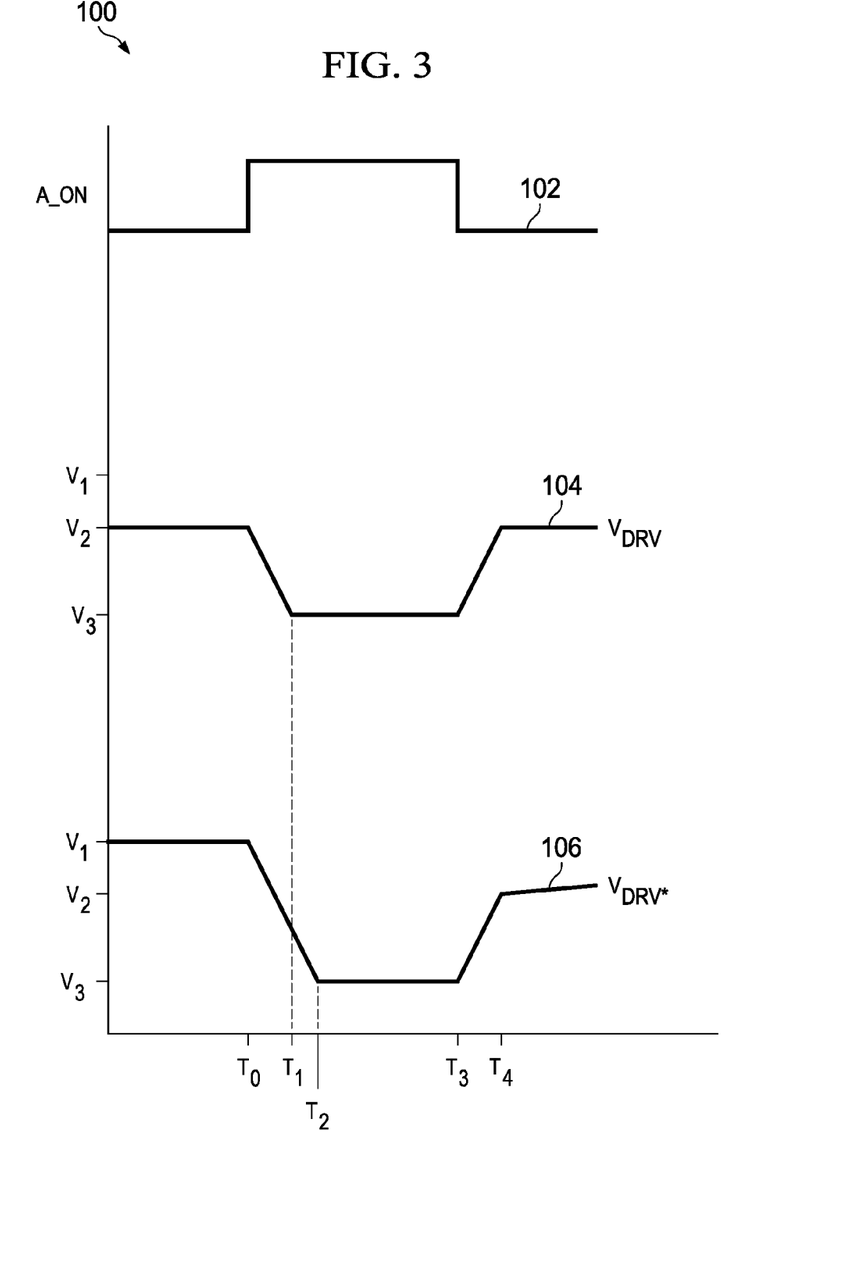
FIG. 3 illustrates an example of a timing diagram.

FIG. 3 illustrates an example of a timing diagram 100. The timing diagram 100 demonstrates the activation signal A_ON at 102, the driver voltage $V_{DRV}$ as affected by the voltage clamp 58 at 104, and a driver voltage $V_{DRV*}$ corresponding to an absence of the voltage clamp 58 at 106, such as for a first LED in a column of sequentially activated rows. The timing diagram 100 thus demonstrates changes in amplitude of the driver voltage $V_{DRV}$ in the activated and deactivated states. In the example of FIG. 3, the driver voltages $V_{DRV}$ and $V_{DRV*}$ are demonstrated relative to a first amplitude $V_1$, a second amplitude $V_2$, and a third amplitude $V_3$. The first amplitude $V_1$ (e.g., approximately 2.87 or more volts) can correspond to the driver voltage $V_{DRV}$ in the deactivated state at an increased voltage amplitude resulting from leakage current from the LEDs in the column charging respective parasitic capacitors over a duration of time (e.g., the second duration of time corresponding to deactivation of all of the rows of the LEDs in the LED array 12, as described previously). The second amplitude $V_2$ (e.g., approximately 2.63 volts) can correspond to a voltage amplitude of the deactivated state, without additional amplitude resulting from leakage current charging respective parasitic capacitors. The third amplitude $V_3$ (e.g., approximately 2.0 volts) can correspond to the driver voltage $V_{DRV}$ in the activated state, such that the LED current $I_D$ flows through an LED in the column to provide illumination. While the example of FIG. 3 does not include the deactivation signal A_OFF, it is to be understood that the deactivation signal A_OFF can be an inverted version of the activation signal A_ON, and thus can have an opposite logic state as the activation signal A_ON at any given time in the timing diagram 100.

Prior to a time $T_0$, the activation signal A_ON is de-asserted. Therefore, the LED driver system 50 is in the deactivated state, such that the activation switch $N_1$ is deactivated based on the switches $SW_1$ and $SW_2$ being open and the switch $SW_3$ being closed. At 104, it is demonstrated that the driver voltage $V_{DRV}$ has the amplitude $V_2$, which can correspond to a maximum voltage of the driver voltage $V_{DRV}$ as set by the voltage clamp 58. For example, the voltage clamp 58 can draw a current from the intermediate node 52 at a magnitude that is approximately equal to a sum of leakage currents of the LEDs in the column of the LED array 12. Therefore, the driver voltage $V_{DRV}$ can be maintained at the voltage amplitude $V_2$ as a maximum amplitude at all times between activations of the activation switch $N_1$ (i.e., during the first duration and the second duration of time). However, at 106, it is demonstrated that the driver voltage $V_{DRV*}$ has the amplitude $V_1$, greater than the amplitude $V_2$, which can result from the absence of the voltage clamp 58, and thus based on a steady slow increase of the driver voltage $V_{DRV}$ in response to leakage current of the LEDs charging the associated parasitic capacitors.

At a time $T_0$, the activation signal A_ON is asserted, such that the switch $SW_3$ is opened and the switches $SW_1$ and $SW_2$ are closed to activate the activation switch $N_1$. As a result, the LED current $I_D$ begins to flow to activate an LED (e.g., the first LED in a column that is sequentially activated by row via the row signals L_A). In response to the flow of the LED current $I_D$, the driver voltage $V_{DRV}$ begins to decrease. At 104, it is demonstrated that the driver voltage $V_{DRV}$ begins to decrease from the amplitude $V_2$ based on the flow of the LED current $I_D$. The driver voltage $V_{DRV}$ decreases down to the amplitude $V_3$ at a time $T_1$, and thus remains at the amplitude $V_3$ during the activated state. Also at the time $T_0$, the driver voltage $V_{DRV*}$ begins to decrease. However, as demonstrated at 106, the driver voltage $V_{DRV*}$ begins to decrease from the amplitude $V_1$, greater than the amplitude $V_2$, based on the flow of the LED current $I_D$. Because the rate of decrease of the driver voltage $V_{DRV}$ does not depend on the presence of the voltage clamp 58, the rate of decrease of the driver voltage $V_{DRV*}$ is the same as the decrease of the driver voltage $V_{DRV}$. Thus, the driver voltage $V_{DRV*}$ likewise decreases down to the amplitude $V_3$, but because the amplitude $V_1$ is greater than the amplitude $V_2$, the driver voltage $V_{DRV*}$ decreases down to the amplitude $V_3$ at a time $T_2$, which is subsequent to the time $T_1$.

At a time $T_3$, the activation signal A_ON is de-asserted, such that the switches $SW_1$ and $SW_2$ are opened and the switch $SW_3$ is closed to deactivate the activation switch $N_1$. As a result, the LED current $I_D$ no longer flows, thus deactivating the associated LED. In response to the cessation of the LED current $I_D$, the driver voltage $V_{DRV}$ and the driver voltage $V_{DRV*}$ begin to increase, reaching the amplitude $V_2$ at a time $T_4$. At a time subsequent to $T_4$, at 104, the driver voltage $V_{DRV}$ is maintained at a substantially constant amplitude at the amplitude $V_2$ based on the voltage clamp 58 drawing the current $I_D$ from the intermediate node 52. However, at 106, without the voltage clamp 58, the driver voltage $V_{DRV*}$ begins to slowly increase based on the leakage current from the LEDs charging the parasitic capacitors.

As demonstrated at 104 and 106, the driver voltage $V_{DRV}$ is maintained at the amplitude $V_3$ for a longer duration of time than the driver voltage $V_{DRV*}$. In the example of FIG. 3, the driver voltage $V_{DRV}$ is held at the amplitude $V_3$, and thus in the activated state to provide illumination from the respective LED, from the time $T_1$ to the time $T_3$. Conversely, the driver voltage $V_{DRV*}$ is held at the amplitude $V_3$, and thus in the activated state to provide illumination from the respective LED, from the amount of time $T_2$ to the time $T_3$, and thus a shorter duration than the driver voltage $V_{DRV}$. Accordingly, the amount of illumination of the respective LED in the column (e.g., the first LED in the sequentially activated rows) provides less illumination in the example at 106 relative to the example at 104. In the example of the LED being the first LED in the sequentially activated rows, and thus after the second duration of time that is longer than a time between sequential activations of the consecutive rows, the driver voltage $V_{DRV*}$ can have the highest amplitude prior to the activated state relative to the activated state of the other LEDs in the column, thus creating the first line dark problem. Accordingly, the voltage clamp 58 can provide the maximum amplitude of the driver voltage $V_{DRV}$ in the deactivated state to maintain a substantially constant amplitude difference between the activated state and the deactivated state for substantially all of the LEDs, thus providing substantial illumination uniformity across an associated LED display.

Figure 4:
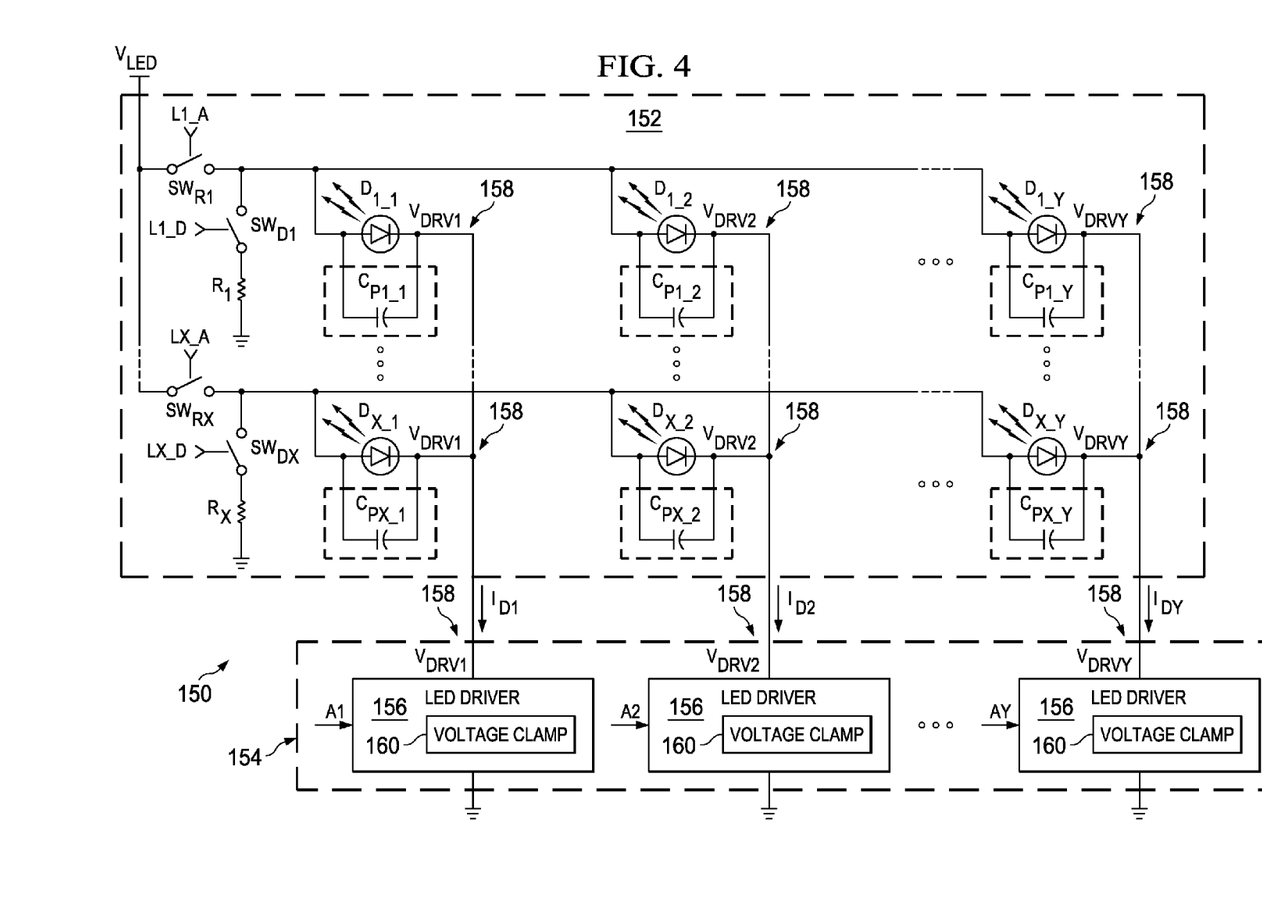
FIG. 4 illustrates another example of an LED system.

FIG. 4 illustrates another example of an LED system 150. The LED system 150 can correspond to the LED system 10 in the example of FIG. 1. Therefore, reference is to be made to the example of FIG. 1 in the following description of the example of FIG. 2.

The LED system 150 includes an LED array 152 that includes a plurality X of rows of LEDs and a plurality Y of columns of LEDs, where X and Y are each positive integers. Thus, the first row of LEDs are designated as $D_{1\_1}$ to $D_{1\_Y}$, and a last row of LEDs are designated as $D_{X\_1}$ to $D_{X\_Y}$, corresponding to a position in the LED array 152 designated by row_column. As an example, the LEDs can be organized by color in a given row and/or column (e.g., red, green, and/or blue). In the example of FIG. 4, the LEDs in the LED array 152 receive power from an LED voltage $V_{LED}$ via respective row switches $SW_{R1}$ to $SW_{RX}$ that are activated by respective row signals L1_A to LX_A, such as generated by the activation controller 16. Thus, the activation controller 16 can sequentially activate the rows of LEDs in the LED array 152 via the respective switches $SW_{R1}$ through $SW_{RX}$ to couple the respective rows to the voltage $V_{LED}$. Similarly, the activation controller 16 can deactivate a given row by opening the respective one of the switches $SW_{R1}$ through $SW_{RX}$ and by closing one of a respective set of switches $SW_{D1}$ through $SW_{DX}$ to couple the respective row to a low-voltage rail (e.g., ground) via a respective resistor R1 through RX. As an example, during the first time duration, one of the rows of the LED array 152 can be activated at a time in a sequence (e.g., row 1 to row X), and during the second duration of time, all of the rows of the LED array 152 can be deactivated.

The LED system 150 also includes an LED controller 154 that includes a plurality of LED driver systems 156 that are each associated with a respective one of the columns 1 through Y of the LED array 152. The LED driver systems 156 are each activated in response to respective activation signals A1 through AY, that can each include the activation signal A_ON and the deactivation signal A_OFF. Thus, the activation signals A1 through AY can include the activation signal A_ON as described in the example of FIGS. 2 and 3 to provide a respective current flow $I_{D1}$ through $I_{DY}$ to activate the respective LED in the column that corresponds to the activated row. Similarly, the activation signals A1 through AY can include the deactivation signal A_OFF as described in the example of FIG. 2 to cease the respective current flow $I_{D1}$ through $I_{DY}$ to deactivate the LEDs in the column.

In the example of FIG. 4, each of the LEDs $D_{1\_1}$ through $D_{X\_Y}$ includes a respective parasitic capacitor $C_{P1\_1}$ through $C_{PX\_Y}$ that is arranged in parallel with the respective LED. In a deactivated state, the LEDs $D_{1\_1}$ through $D_{X\_Y}$ can provide a leakage current that can charge the respective parasitic capacitors $C_{P1\_1}$ through $C_{PX\_Y}$, thus increasing respective driver voltages $V_{DRV1}$ through $V_{DRVY}$ at intermediate nodes 158 that interconnect the LEDs $D_{1\_1}$ through $D_{X\_Y}$ with the respective LED driver systems 156. Therefore, to substantially mitigate the increase of the respective driver voltages $V_{DRV1}$ through $V_{DRVY}$ during a deactivated state of the LEDs $D_{1\_1}$ through $D_{X\_Y}$, and thus to substantially mitigate non-uniform illumination of the LEDs $D_{1\_1}$ through $D_{X\_Y}$, the LED driver systems 156 each include a voltage clamp 160. As an example, the voltage clamps 160 can be configured to conduct a current $I_{CLMP}$ from the respective intermediate nodes 158, thus setting a substantially constant amplitude difference between the driver voltage $V_{DRV1}$ through $V_{DRVY}$ in each of the activated and deactivated states, such as described previously regarding the example of FIGS. 2 and 3. For example, the voltage clamps 160 can be configured as current sources or as resistors, which can be static or programmable, to conduct the current $I_{CLMP}$ that can have a magnitude, for example, that is approximately equal to the leakage current of the LEDs $D_{1\_1}$ through $D_{X\_Y}$.

Figure 5:
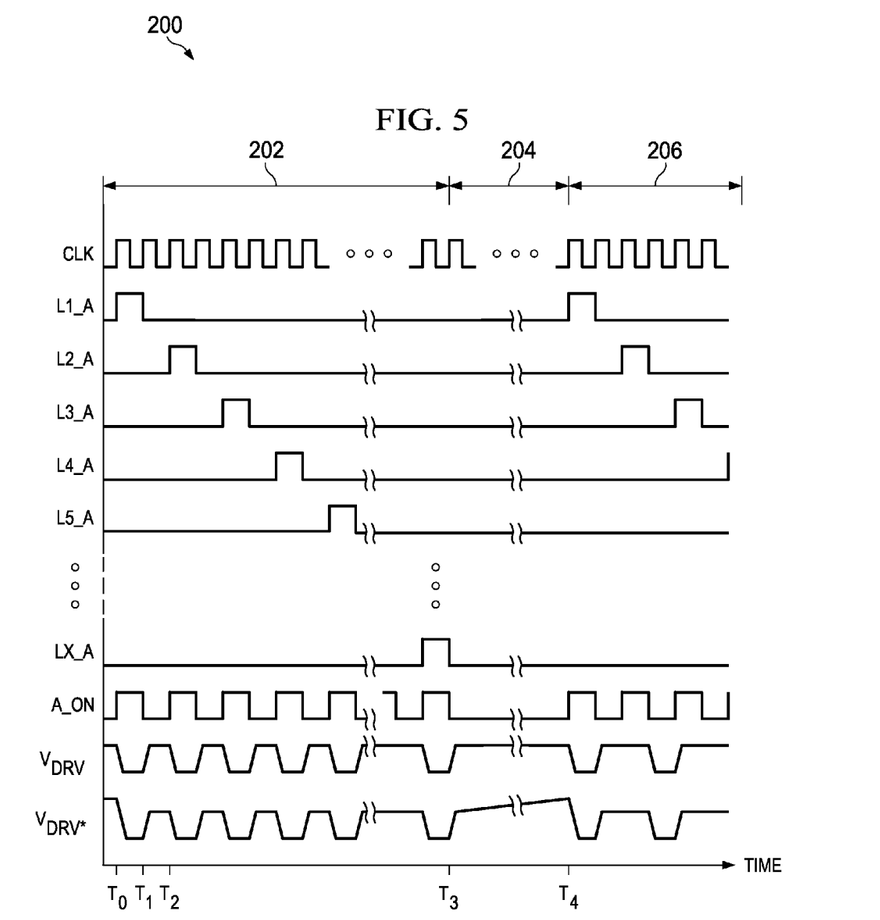
FIG. 5 illustrates another example of a timing diagram.

FIG. 5 illustrates another example of a timing diagram 200. The timing diagram 200 can correspond to a timing diagram for the LED system 150 in the example of FIG. 4. Therefore, reference is to be made to the example of FIG. 4 in the following description of the example of FIG. 5. The timing diagram 200 can correspond to a specific column of LEDs of the LED array 152.

The timing diagram 200 demonstrates the clock signal CLK, the row signals L1_A through LX_A, the activation signal A_ON, the driver voltage $V_{DRV}$ of a respective one of the LED driver systems 156, and the driver voltage $V_{DRV*}$ corresponding to a respective hypothetical LED driver that does not include a voltage clamp 160, similar to as described previously in the example of FIG. 5. At a time $T_0$, the first time duration, demonstrated at 202, begins. Thus, at the time $T_0$, the activation controller 16 begins to sequentially activate the rows of LEDs of the LED array 152. At the time $T_0$, the row signal L1_A is asserted to activate the first row (e.g., row 1 via the switch $SW_{R1}$). The activation signal A_ON of the respective LED driver system 156 is thus concurrently asserted with the row signal L1_A. Accordingly, the respective current $I_D$ flows through the activated LED (e.g., LED D1_1) to provide illumination. The driver voltage $V_{DRV}$ thus decreases from a deactivated state amplitude (e.g., the amplitude $V_2$) to an activated state amplitude (e.g., the amplitude $V_3$). Additionally, driver voltage $V_{DRV*}$ decreases from a deactivated state amplitude (e.g., the amplitude $V_1$) that is greater than the deactivated state amplitude of the driver voltage $V_{DRV}$ (e.g., the amplitude $V_2$) to the activated state amplitude (e.g., the amplitude $V_3$). As an example, the deactivated state amplitude of the driver voltage $V_{DRV*}$ can be based on the charging of parasitic capacitors (e.g., $C_{P1\_1}$ through $C_{PX\_1}$) of the LEDs via respective leakage currents, such as during a previously occurring second time duration.

At a time $T_1$, the row signal L1_A is de-asserted to deactivate the first row (e.g., row 1 via the switch $SW_{D1}$). The activation signal A_ON of the respective LED driver system 156 is thus concurrently de-asserted with the row signal L1_A. As an example, at the time $T_1$, the row signal L1_D and the deactivation signal A_OFF (not shown, respectively) can be asserted. Accordingly, the respective current $I_D$ ceases to flow through the respective LED (e.g., LED $D_{1\_1}$), thus deactivating the LED. In the example of FIG. 5, the row signal L1_A and the activation signal A_ON thus have a duration of one period of the clock signal CLK. However, it is to be understood that the relationship between the row signals L_A and the activation signal A_ON relative to the clock signal CLK can be different than as demonstrated in the example of FIG. 5. At a time $T_2$, the row signal L2_A is asserted to activate the second row (e.g., row 2 via the switch SWR2). The activation signal A_ON of the respective LED driver system 156 is thus concurrently asserted with the row signal L2_A. Accordingly, the respective current $I_D$ flows through the activated LED (e.g., LED D1_2) to provide illumination. Both the driver voltage $V_{DRV}$ and the driver voltage $V_{DRV*}$ decrease from approximately the same amplitude. For example, the charging of the parasitic capacitors via the leakage current may be substantially negligible in the short time between the times $T_1$ and $T_2$.

Therefore, the first time duration continues with sequential activation of the rows 1 through X via the row signals L1_A through LX_A, as described previously. At a time $T_3$, the last row X of the LEDs in the LED array 152 is deactivated, thus concluding the first time duration 202 (e.g., from the time $T_0$ to the time $T_3$) and beginning the second time duration 204. During the second time duration 204, none of the rows 1 through X are activated via the row signals L1_A through LX_A, and the activation signal A_ON is not asserted. As an example, the second time duration 204 can be much greater than a time between sequential activation of consecutive rows (e.g., between the time $T_1$ and $T_2$). For example, the second time duration 204 can be greater than the first time duration 202 (e.g., having more cycles of the clock signal CLK). During the second time duration 204, the voltage clamp 160 in the LED driver system 156 can provide the current flow $I_{CLMP}$ from the intermediate node 158 to set a maximum amplitude of the driver voltage $V_{DRV}$ in the deactivated state (e.g., at the amplitude $V_2$). Therefore, the driver voltage $V_{DRV}$ is held at a substantially constant amplitude during the second time duration 204. However, absent the voltage clamp 160, the driver voltage $V_{DRV*}$ is demonstrated as slowly increasing during the second time duration 204 to an amplitude (e.g., the amplitude $V_1$) that is greater than a deactivated state magnitude between activations of consecutive rows (e.g., between the time $T_1$ and the time $T_2$). It is to be understood that the increased amplitude of the driver voltage $V_{DRV*}$ is exaggerated in the example of FIG. 5 by scale for the sake of demonstration.

At a time $T_4$, another first time duration, demonstrated at 206, begins. Thus, at the time $T_4$, the activation controller 16 again begins to sequentially activate the rows of LEDs of the LED array 152. At the time $T_0$, the row signal L1_A is asserted to again activate the first row (e.g., row 1 via the switch $SW_{R1}$). The activation signal A_ON of the respective LED driver system 156 is thus concurrently asserted with the row signal L1_A. Accordingly, the respective current $I_D$ flows through the activated LED (e.g., LED $D_{1\_1}$) to provide illumination. The driver voltage $V_{DRV}$ thus decreases from the maximum deactivated state amplitude (e.g., the amplitude $V_2$) set by the voltage clamp 160 to the activated state amplitude (e.g., the amplitude $V_3$). However, the driver voltage $V_{DRV*}$ decreases from the increased deactivated state amplitude (e.g., the amplitude $V_1$) that is greater than the deactivated state amplitude of the driver voltage $V_{DRV}$ (e.g., the amplitude $V_2$) to the activated state amplitude (e.g., the amplitude $V_3$). Therefore, the amount of time that the LED in the first row (LED $D_{1\_1}$) is at the activated state voltage, and thus is activated to provide illumination, is less than the amount of time that the LEDs in the other rows are at the activated state voltage, and thus is activated to provide illumination. Accordingly, the LED display experiences the first line dark problem, resulting in a non-uniformity of the LED display. As a result, by incorporating the voltage clamp 160 in each of the LED driver systems 156, the difference of the driver voltage $V_{DRV}$ between the activated state and the deactivated state is substantially constant for each of the LEDs, thus providing an approximately equal amount of activation time for each of the LEDs in a given column. Accordingly, the LED system 150 can provide substantially uniform illumination across the entirety of the respective portion of an LED display surface.

Figure 6:
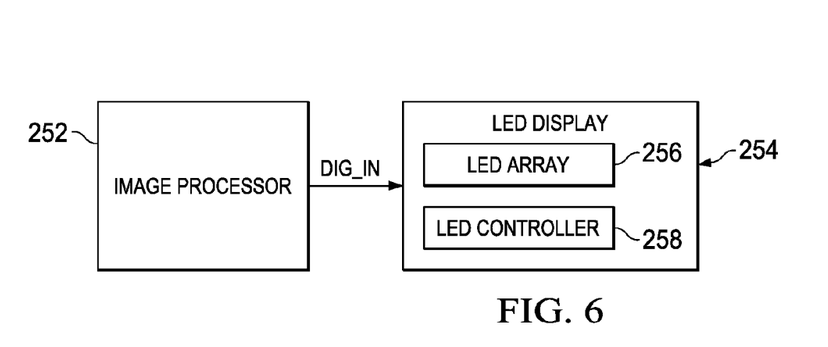
FIG. 6 illustrates an example of a display system.

FIG. 6 illustrates an example of a display system 250. The display system 250 can correspond to a display system for a computer, such as for a computer monitor, an LED television, or an LED wall. The display system 250 includes an image processor 252 that can be configured to generate image data, such as in response to a broadcast communication signal in a television system or from a processor in a computer system. The display system 250 also includes an LED display 254 that receives the image data, demonstrated as the digital input DIG_IN in the example of FIG. 6. As an example, the LED display 254 can be an LED television, a computer monitor, or an LED wall. The LED display 254 includes an LED array 256, such as similar to the LED array 152 in the example of FIG. 4, and an LED controller 258, such as similar to the LED controller 14 in the example of FIG. 1 or the LED controller 154 in the example of FIG. 4. As a result, the LED controller 258 can include LED driver systems, such as similar to the LED driver system 50 in the example of FIG. 2. As an example, each of the LED driver systems can include a voltage clamp configured to conduct a current from an intermediate node that interconnects the respective LED driver system from the column of LEDs in the LED array 256. Accordingly, the LED display 254 can provide illumination in a substantially uniform manner based on the voltage clamps setting a maximum driver voltage at the intermediate node in a deactivated state, as described herein.

Figure 7:
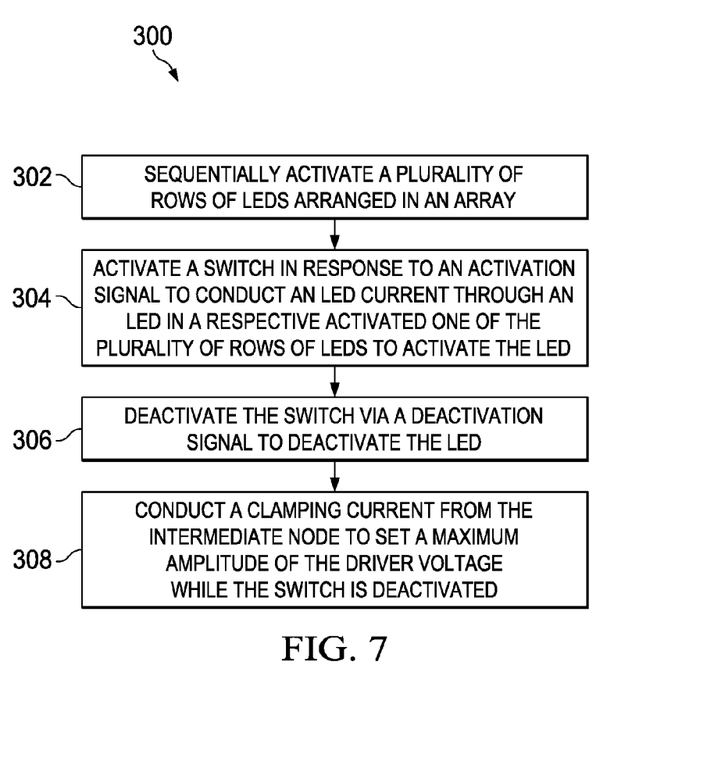
FIG. 7 illustrates an example of a method for providing substantially uniform illumination in a light-emitting diode (LED) system.

In view of the foregoing structural and functional features described above, certain methods will be better appreciated with reference to FIG. 7. It is to be understood and appreciated that the illustrated actions, in other embodiments, may occur in different orders and/or concurrently with other actions. Moreover, not all illustrated features may be required to implement a method.

FIG. 7 illustrates an example of a method 300 for providing substantially uniform illumination in an LED system (e.g., the LED system 10). At 302, a plurality of rows of LEDs (e.g., the rows 1 through X) arranged in an array (e.g., the LED array 12) are sequentially activated. At 304, a switch (e.g., the activation switch $N_1$) is activated in response to an activation signal (e.g., the activation signal A_ON) to conduct an LED current (e.g., the current $I_D$) through an LED (e.g., the LED $D_{1\_1}$) in a respective activated one of the plurality of rows of LEDs to activate the LED. The switch can be coupled to the LED via an intermediate node (e.g., the intermediate node 52) having a driver voltage (e.g., the driver voltage $V_{DRV}$). At 306, the switch is deactivated via a deactivation signal (e.g., the deactivation signal A_OFF) to deactivate the LED. At 308, a clamping current (e.g., the clamping current $I_{CLMP}$) is conducted from the intermediate node to set a maximum amplitude of the driver voltage while the switch is deactivated.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A light-emitting diode (LED) system comprising:
an LED array comprising a plurality of LEDs that are each activated via an LED current provided therethrough to provide illumination; and
an LED controller configured to sequentially activate the plurality of LEDs via at least one LED driver system configured to selectively provide the LED current through each sequential one of the plurality of LEDs in an activated state in response to an activation signal, the at least one LED driver system comprising a voltage maintenance circuit configured to maintain a substantially constant amplitude difference of a driver voltage associated with the LED current from the activated state to a deactivated state where off times of the LEDs that vary per cycle with some off times being longer than others and the maintained voltage is substantially constant over off times that are shorter or longer, wherein the plurality of LEDs of the LED array are arranged in a plurality of rows and a plurality of columns, wherein the LED controller further comprises an activation controller configured to sequentially activate each of the plurality of rows of the plurality of LEDs and to provide the activation signal in response to a digital input to activate a respective one of the plurality of LEDs in a given activated one of the plurality of rows, and wherein a darkness of a first line corresponding to a first row of sequentially activated LEDs is reduced or eliminated.

2. The system of claim 1, wherein the voltage maintenance circuit is configured as one of a current source and a resistor configured to conduct a clamping current to set a maximum amplitude of the driver voltage in the deactivated state.

3. The system of claim 1, wherein the voltage maintenance circuit is programmable to set a value of the amplitude difference of the driver voltage from the activated state to the deactivated state.

4. The system of claim 1, wherein the activation controller is configured to sequentially activate each of the plurality of rows during a first time duration based on a clock signal, and is further configured to deactivate the plurality of rows during a second time duration based on the clock signal, wherein the activation controller is alternates between the first time duration and the second time duration, and wherein the second time duration is greater than a time duration between the activation of consecutive rows of the plurality of rows.

5. The system of claim 1, wherein the LED driver system comprises an activation switch coupled to one of the plurality of columns of the plurality of LEDs via an intermediate node, the activation switch being configured to conduct the LED current in response to the activation signal, wherein the driver voltage is a voltage associated with the intermediate node.

6. The system of claim 5, wherein the voltage maintenance circuit is configured as one of a current source and a resistor configured to conduct a clamping current from the intermediate node to set a maximum amplitude of the driver voltage in the deactivated state.

7. The system of claim 6, wherein the clamping current is selected to be approximately equal to a leakage current associated with the respective one of the plurality of columns of the plurality of LEDs.

8. The system of claim 1, wherein the LED driver system comprises an amplifier configured to activate an activation switch that is coupled to the LED array via an intermediate node having the driver voltage to conduct the LED current in response to the activation signal, wherein the voltage maintenance circuit is configured as one of a current source and a resistor configured to conduct a clamping current from the intermediate node.

9. An LED display system comprising the LED system of claim 1.

10. A method for providing substantially uniform illumination in a light-emitting diode (LED) system, the method comprising:
sequentially activating a plurality of rows of LEDs arranged in an array;
activating a switch in response to an activation signal to conduct an LED current through an LED in a respective activated one of the plurality of rows of LEDs to activate the LED, the switch being coupled to the LED via an intermediate node having a driver voltage;
deactivating the switch via a deactivation signal to deactivate the LED; and conducting a maintaining current from the intermediate node to set a maximum amplitude of the driver voltage while the switch is deactivated, where off times of the LEDs that vary per cycle with some off times being longer than others and the amplitude of the driver voltage is substantially constant over off times that are shorter or longer, wherein a darkness of a first line corresponding to a first row of sequentially activated LEDs is reduced or eliminated.

11. The method of claim 10, wherein conducting the maintaining current comprises conducting the clamping current via one of a current source and a resistor interconnecting the intermediate node and a low voltage rail.

12. The method of claim 10, further comprising dynamically setting an amplitude of the maintaining current to dynamically set the maximum amplitude of the driver voltage.

13. The method of claim 12, wherein setting the amplitude of the maintaining current comprises setting the amplitude of the maintaining current approximately equal to a leakage current associated with at least one LED in a respective column of LEDs in the array.

14. The method of claim 10, wherein the sequentially activating the plurality of rows comprises:
sequentially activating each of the plurality of rows during a first time duration based on a clock signal;
deactivating the plurality of rows during a second time duration based on the clock signal; and
alternating between the first time duration and the second time duration, and wherein the second time duration is greater than a time duration between the activation of consecutive rows of the plurality of rows and varies per cycle.

15. The method of claim 10, wherein activating the switch and deactivating the switch comprises activating the switch and deactivating the switch via an amplifier configured to set a bias voltage for the switch based on a reference voltage.

16. A controller for a light-emitting diode (LED) system comprising an LED array comprising a plurality of LEDs arranged in a plurality of rows and a plurality of columns that are each activated via an LED current provided therethrough to provide illumination, an LED controller comprising:
an activation controller configured to sequentially activate each of the plurality of rows and to provide activation signals in response to a digital input; and
a plurality of LED driver systems that are each associated with a respective one of the plurality of columns, each of the plurality of LED driver systems being configured to activate one of the plurality of LEDs in a respective activated one of the plurality of rows in response to a respective one of the activation signals, each of plurality of LED driver systems comprising a voltage maintenance circuit configured to maintain a substantial constant amplitude difference of a driver voltage associated with the LED current between activation of one of the plurality of LEDs in the respective one of the plurality of columns and deactivation of the plurality of LEDs in the respective one of the plurality of columns, where off times of the LEDs that vary per cycle with some off times being longer than others and the maintained voltage is substantially constant over off times that are shorter or longer and wherein a darkness of a first line corresponding to a first row of sequentially activated LEDs is reduced or eliminated.

17. The system of claim 16, wherein each of the plurality of LED driver systems comprises an amplifier configured to activate an activation switch that is coupled to the respective one of the plurality of columns via an intermediate node having the driver voltage to conduct the LED current in response to the respective one of the plurality of activation signal, wherein the voltage maintenance circuit is configured as one of a current source and a resistor configured to conduct a clamping current from the intermediate node.

18. The system of claim 16, wherein the voltage maintenance circuit is programmable to set a value of the amplitude difference of the driver voltage from the activated state to the deactivated state.

19. The system of claim 16, wherein the clamping current is selected to be approximately equal to a leakage current associated with the respective one of the plurality of columns of the plurality of LEDs.

* * * * *